UNITED STATES PATENT OFFICE.

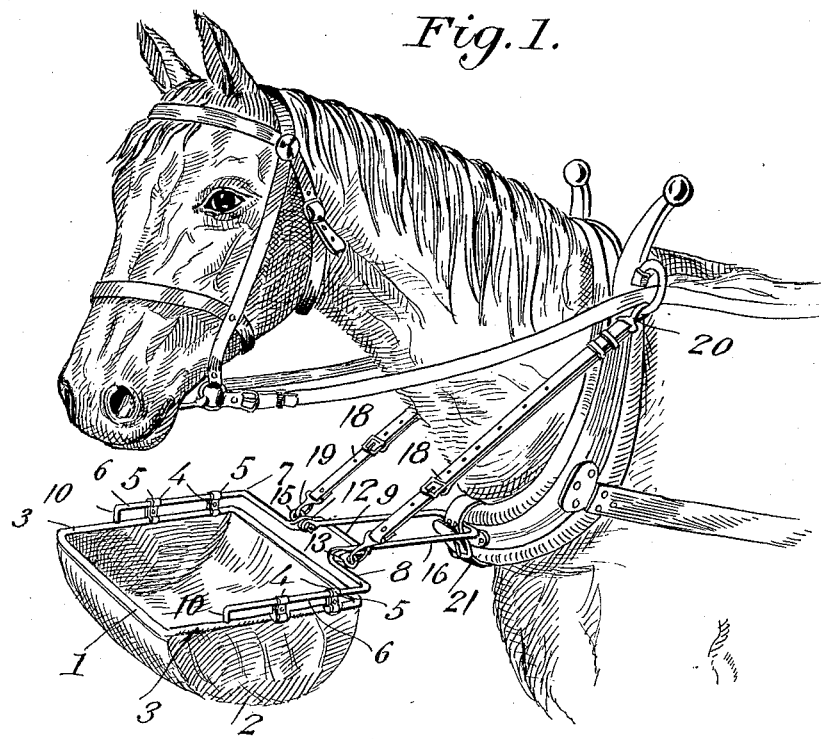
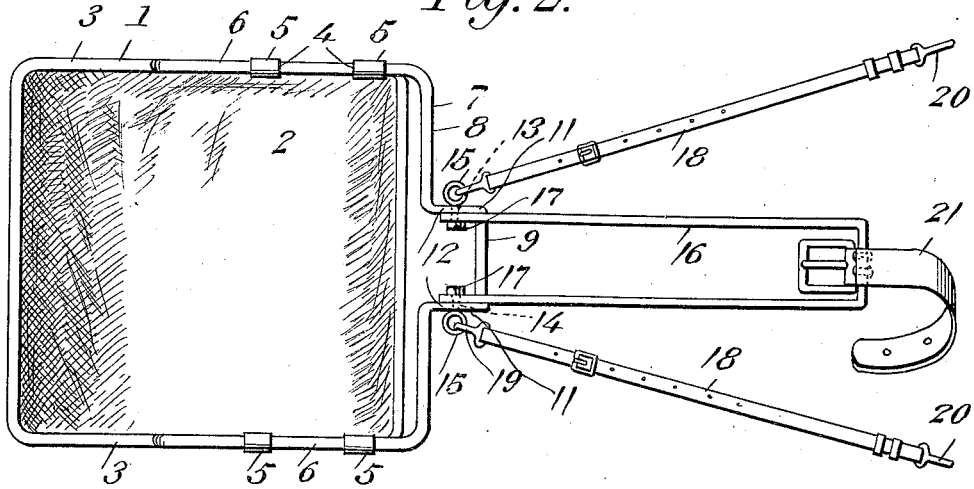

JOHN H. BEALS, OF WINCHESTER, INDIANA.

FEED-BAG.

1,056,730.  
Specification of Letters Patent.  
Patented Mar. 18, 1913.

Application filed August 23, 1911. Serial No. 645,497.

*To all whom it may concern:*

Be it known that I, JOHN H. BEALS, a citizen of the United States, residing at Winchester, in the county of Randolph and State of Indiana, have invented new and useful Improvements in Feed-Bags, of which the following is a specification.

The present invention relates to certain novel and useful improvements in feed bags for horses or other draft animals, and has particular application to an adjustable and collapsible feed bag which may be attached to the harness in such manner that the animal may be fed from the same while harnessed.

A further object of my invention is to provide a simple, compact and convenient form of feed bag, which is adapted to be attached to the collar and hames of the harness, so that the entire weight of the bag and its contents will be borne by the collar, the animal being free to move its head while feeding.

I also aim to provide a feed bag of the class described which will contain the food in such manner as to be readily accessible to the animal, so that the latter in eating may obtain the food from the bottom of the bag, as well as the top, thereby avoiding wasting of the food incident to the animal tossing its head while feeding.

With the above-recited objects, and others of a similar nature in view, the invention consists in the construction, combination and arrangement of parts, set forth in and falling within the scope of the appended claims.

In the accompanying drawing:—Figure 1 is a perspective view of my improved feed bag, showing the manner of attaching the same to the horses' harness. Fig. 2 is a top plan view.

Referring now to the accompanying drawings in detail, the numeral 1 indicates the bag-supporting frame, which may be of any suitable material and of any preferred shape, and in the present instance preferably in the form of a square or rectangular frame constructed of metal, such as bar iron or the like. Attached to and supported by this frame is the feed bag 2 which is formed of any suitable flexible material, such as canvas or similar fabric. Attached to the side members 3—3 of the bag supporting frame are the brackets 4, through the sleeve portions 5 of which extend the parallel arms 6—6 of the U-shaped sliding frame 7, the central cross bar 8 of such U-shaped frame being bent to form the offset 9. This U-shaped sliding frame is also preferably constructed of a rod or bar of metal bent into the form shown, the free ends of the arms 6 being bent downwardly as at 10 to avoid the possibility of the reins or bridle attaching beneath the arms while the horse is feeding and at the same time such downwardly bent portions form a stop to prevent the bag from sliding off of or becoming detached from the arms. The parallel side members 11 of the offset in the cross bar of the U-shaped frame are flattened as at 12, and provided with bores 13 for the passage of the shank 14 of the eye bolts 15. Pivotally connected to this offset portion of the frame by means of the eye bolts is the elongated U-shaped metallic strap 16, the ends of the shanks of the eye bolts being provided with nuts 17 for securing the bolts in proper position and at the same time permitting the pivoted movement or folding of the U-shaped strap 16, upon the frame of the bag. When the strap is extended or unfolded, as when the bag is in use, the arms of the strap bear against and are supported by the offset portion of the main frame.

The numerals 18—18 indicate flexible side straps of leather or other suitable material, detachably connected by snap hooks 19—19 to the eyes of the eye bolts, and at their opposite ends said straps are provided with snap hooks 20—20 by means of which the straps are fastened in supporting position by the hames of the harness.

In use, when the pivoted metallic strap of the device is extended or unfolded, it is attached to the horse's collar by means of the strap 21 which is fastened at the end of the U-shaped metallic strap 16.

From the above description, taken in connection with the accompanying drawing, the construction and manner of employing my improved feed bag will be readily apparent. When it is desired to use the same, the U-shaped metallic strap is folded outward and the frame carrying the bag adjusted along the arms of the U-shaped supporting frame to the desired point. The entire device is fastened to the hames and collar of the harness by means of the straps as has been described. It will be seen that the entire weight of the feed bag is borne by the harness and that the animal is free to move its head to obtain the food in the bag.

After the animal has been fed, the bag may be removed and folded into compact form, so that it may be stored in a relatively small space.

I claim:—

1. A feed bag comprising a frame, a bag of flexible material carried thereby, a U-shaped frame, adjustable connections between the U-shaped frame and the bag supporting frame whereby the bag may be moved longitudinally of the U-shaped frame, said U-shaped frame having an offset portion, a U-shaped metallic strap member pivotally connected to the U-shaped frame at the offset portion thereof, said offset portion forming a stop to limit the relative movement between the U-shaped frame and the U-shaped strap member in one direction, and means for attaching the feed bag to the hames and collar of the harness.

2. A feed bag comprising a frame carrying a bag of flexible material, brackets formed with sleeves carried by said frame, a U-shaped supporting frame having parallel arms extending through the brackets, whereby the bag carrying frame is adjustably supported on the arm, said U-shaped supporting frame having an offset portion in the cross bar thereof, a rigid metallic strap having side members pivotally secured to the offset portion of the supporting frame, flexible straps for connecting the bag to the hames of a harness, and a strap carried by the pivoted rigid strap for connecting the device to the collar of the harness.

3. A feed bag comprising a frame, a bag of flexible material carried thereby, brackets formed with sleeves mounted upon the bag frame, a U-shaped supporting frame having parallel arms extending through the brackets, the ends of said arms being turned downwardly, a rigid metallic strap pivoted to the cross bars of the U-shaped frame, eye bolts forming pivots connecting the strap and frame, flexible straps detachably connected to the eye bolts and adapted to be detachably connected to the hames of a harness, and a flexible strap connecting the rigid pivoted strap to the collar of the harness.

In testimony whereof I affix my signature in presence of two witnesses.

JOHN H. BEALS.

Witnesses:
 A. M. BROWN,
 JOHN W. BRAGG.

Copies of this patent may be obtained for five cents each, by addressing the "Commissioner of Patents, Washington, D. C."